3,234,304
FLUORINATED ALKARYLOXY PHOSPHONITRILES

George M. Nichols, Pitman, N.J., assignor to E. I. du Pont de Nemours and Company, Wilmington, Del., a corporation of Delaware
No Drawing. Filed May 7, 1962, Ser. No. 193,657
7 Claims. (Cl. 260—927)

This invention relates to novel reaction products and methods for their preparation. These novel reaction products, because of their wide range between the freezing point and boiling point, are useful as working fluids, high-temperature lubricants, chemical intermediates, and as plasticizers.

In accordance with this invention there are provided novel polymeric cyclic phosphonitriles selected from the group consisting of (A) phosphonitrilic compositions of the formula $P_mN_mR_nR'_{2m-n}$ wherein R is meta-trifluoromethylphenoxy, R' is phenoxy, m is an integer from 3 to 7 and n is an integer from 1 to $2m$, and (B) mixtures of (A) and phosphonitrilic compositions selected from the group consisting of those of the formula $P_mN_mR_nR'_{2m-n}$, wherein R, R' and m are as defined above and n is an integer from 0 to $2m$, said mixtures containing a maximum of about 27% by weight of the composition where n is 0, i.e., the compositions of the type (B) should not contain more than 27% by weight of the fully substituted phenoxy phosphonitriles of the formula $P_mN_mR'_{2m}$, R' and m being as defined.

These novel polymeric, cyclic phosphonitriles are prepared by a process comprising reacting, at a temperature from about 60° C. to about 200° C., (D) a polymeric phosphonitrilic halide of the formula $P_mN_mX_{2m}$ where m is an integer from 3 to 7 and X is a halogen selected from the group consisting of bromine and chlorine, and (E) a member selected from the group consisting of an alkali salt of meta-trifluoromethylphenol, and a mixture of an alkali salt of meta-trifluoromethylphenol and an alkali salt of phenol, and recovering said reaction product, with the proviso that when said mixture is selected, the molar ratio of said alkali salt of meta-trifluoromethylphenol to said alkali salt of phenol is greater than one to four and that the molar sum of said alkali salts per mole of phosphonitrilic halide is equal to at least $2m$.

In the above process, the stoichiometric proportions of reactants are dependent on the product desired. For example, if a product is desired having the formula $P_3N_3R_6R'O$, where R and R' are defined as above, i.e., hexakis(m-trifluoromethylphenoxy)triphosphonitrile

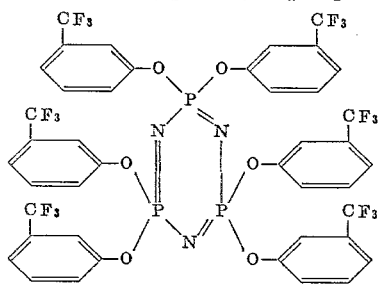

the moles of alkali salt of m-trifluoromethylphenol used are at least equal to the number of moles of polymeric phosphonitrilic halide used multiplied by twice the number of units in the polymeric phosphonitrilic halide, i.e., at least six moles of the alkali salt are provided for each mole of the trimer. If a mixed phenoxy- and m-trifluoromethylphenoxy-substituted phosphonitrile product is desired, e.g., a product in which the principal product is tetraphenoxy-bis(m-trifluoromethylphenoxy)triphosphonitrile, then the molar ratio of alkali salt of m-trifluoromethylphenol to alkali salt of phenol is approximately 4 to 2, at least six moles of the combined alkali salts being provided for each mole of phosphonitrilic halide trimer. Within the molar ratio of alkali salt of phenol to alkali salt of m-trifluoromethylphenol specified below, the resulting mixture of phenoxy- and m-trifluoromethyl phenoxy substituted phosphonitrile products will contain a maximum of 27% by weight of a fully substituted phenoxy phosphonitrile product.

To obtain products liquid at room temperature or below and stable at temperatures up to 400° C., it is essential that the maximum amount of alkali phenoxide present for each mole of alkali m-trifluoromethylphenoxide be four moles. When amounts greater than this are provided, the product obtained is a crystalline material and obviously cannot be used as a working fluid. Any molar ratio of alkali phenoxide/m-trifluoromethylphenoxide below 4/1 is applicable. Regardless of the molar ratio of alkali phenoxide/m-trifluoromethylphenoxide up to 4/1, the molar sum of the alkali phenoxide and alkali m-trifluoromethylphenoxide is at least equal to twice the number of phosphorus atoms, i.e., all of the halo atoms of the polymeric phosphonitrilic halide are replaced by m-trifluoromethylphenoxy groups or by m-trifluoromethylphenoxy and phenoxy groups.

The polymeric phosphonitrilic chlorides or bromides suitable in the invention range from the trimers to the heptamers. The trimer or tetramer alone or, if desired, a mixture of the trimer to the heptamer may be used, for example, the liquid fraction of polymeric phosphonitrilic chlorides obtainable by the Schenck and Römer method (Ber. 57B, 1343 (1924)). The preferred polymeric phosphonitrilic halides are the readily available phosphonitrilic chloride trimer and tetramer.

The alkali salts, e.g., sodium or potassium (preferred), of phenol and m-trifluoromethylphenol may be added to the reaction mixture as such or the salts may be prepared in situ. The reaction is generally effected at a temperature between about 60° C. and about 200° C., with the preferred range being between 120 and 150° C., until the condensation reaction is essentially complete. Below a temperature of 60° C., the reaction rate is so low as to be economically unfeasible. Above a temperature of 200° C., the reaction, which is exothermic, is difficult to control. At the preferred temperature range between 120 and 150° C., the reaction period may range from 1 to 7 hours. Although a sufficient amount of desired product is obtained in a 1-hour period, a period of 5–7 hours is preferred to insure the completion of reaction. Heating the mixture above 7 hours provides no economic advantages.

The reaction may be effected with or without a solvent. However, since the reaction is exothermic, a water bath or cooling devices, such as coils, must be used if no solvent is present. Also, a solvent is required in the work-up of the product. The preferred procedure is to have a non-reactive solvent initially present. Suitable inert solvents are the aliphatic and aromatic hydrocarbon solvents which boil between 60 and 200° C., and dissolve the polymeric phosphonitrilic halides, e.g., the xylenes (o-, m-, p- or their mixtures), benzene, toluene, and petroleum ethers, and the halogenated aliphatic and aromatic hydrocarbons, such as chlorobenzene, sym-tetrachloroethane, and carbon tetrachloride. The amount of solvent used is not critical. Generally, the amount used is that necessary to facilitate control of the reaction, i.e., to absorb the heat of reaction, and to facilitate product work-up. In most instances, the amount of solvent used will range between 7 and 16 parts per part, by weight, of polymeric phosphonitrilic halide. Of course, excess amounts of solvent are not recommended for economic reasons.

To recover the products of this invention from the mixture, a nonreactive solvent, if not present during the reaction, is added to facilitate the product separation. The desired product is recovered by washing the solvent solution of the reaction mixture with a dilute (approximately 5%, by weight) aqueous alkali hydroxide solution, e.g., potassium hydroxide, to dissolve alkali chloride, e.g., potassium chloride, formed as by-product of the reaction and to dissolve any unreacted phenol, if present, and alkali phenoxides, separating the organic phase containing the desired reaction product from the aqueous phase, rewashing the organic phase with aqueous alkali hydroxide solution and then with dilute (approximately 5% by weight) aqueous sodium sulfate solution to remove any alkali hydroxide remaining in the organic layer, the aqueous phases being discarded after each wash, drying the organic phase over anhydrous sodium sulfate, filtering the sodium sulfate from the organic phase, treating the organic phase with activated charcoal to remove any color-imparting by-products, filtering the charcoal from the organic phase, removing the solvent from the organic phase, e.g., by distillation, and distilling at reduced pressure, the desired products boiling between 250 and 400° C. at 0.2 mm. Hg.

If desired, variations in the above recovery procedure may be introduced without departing from the scope of the invention. For example, the organic phase may be treated several times with the activated charcoal prior to the distillation, or, optionally, the desired products boiling between 250 and 400° C. at 0.2 mm. Hg may be treated with activated charcoal to insure the recovery of a colorless liquid product. The temperature and pressure at which the desired products are distilled is dependent on whether the desired product is a single compound or a mixture of phenoxy - m - trifluoromethylphenoxyphosphonitriles. For example, hexakis(m - trifluoromethylphenoxy)triphosphonitrile distills at 250° C. at 0.2 mm. Hg, whereas, mixtures of the phenoxy-m-trifluoromethylphenoxyphosphonitriles distill within the range 250–400° C. at 0.2 mm. Hg. Because of the proximity of the boiling points of the individual components of the mixtures of the phenoxy-m-trifluoromethylphenoxyphosphonitriles, the individual components are very difficult to separate by ordinary separation methods, such as distillation. However, isolation of specific components is not usually required since these mixtures are highly satisfactory fluids for most applications, the liquid ranges of these mixtures being within a few degrees of the liquid ranges of the phosphonitrile compounds fully substituted with m-trifluoromethylphenoxy groups.

The following examples illustrate the invention. The compositions described in the examples have many properties which make them very valuable for high-temperature fluid applications. For example, all of the compositions described have outstandingly good oxidation resistance up to 600° F. and higher in several cases. They all have good aluminum and stainless steel oxidation-corrosion resistance up to 600° F. They are excellent lubricants; for instance the product of Example 1 produced no deleterious effects when carried to the maximum load limit of the Falex lubricity test rig. All of the compositions have very good hydrolytic stability. They are all thermally stable to over 750° F. They all have very low evaporative losses due to their high boiling points. These combinations of properties make the subject compositions extremely valuable for high-temperature fluid applications as lubricants, heat transfer media, hydraulic fluids, and a variety of other applications where thermal and chemical stability are important. Parts in the examples are parts by weight. The viscosity of the products in the examples was determined with calibrated Cannon-Manning Semi-Micro viscometers in constant temperature baths by standard techniques. The pour point of the products in the examples is the lowest temperature at which the material will flow in a 1 3/16-inch diameter tube. The pour points were determined according to ASTM Method D–97–57 (ASTM Standards. 1958 edition, part 7, p. 50).

*Example 1*

A mixture of 58 parts (0.17 mole) of phosphonitrilic chloride trimer $(PNCl_2)_3$, 75.3 parts (0.80 mole) of phenol, 65.0 parts (0.40 mole) of m-trifluoromethylphenol, 67.3 parts (1.20 moles) of potassium hydroxide pellets, and 603 parts of p-xylene as solvent was charged to a three-necked flask equipped with a mechanical stirrer, thermometer, and water collector with reflux condenser. The mixture was heated to reflux at 144° C. for six hours. During the reaction, 28 parts of water was collected. The reaction mixture was cooled and 523 parts of 5% aqueous potassium hydroxide solution was added with stirring. This mixture was transferred to a separatory funnel and the aqueous (lower) layer was drawn off. The product (upper) layer was washed successively with 523 parts of 5% aqueous potassium hydroxide and two 520-part portions of 5% aqueous sodium sulfate solution, the aqueous layers being discarded in each case. The product solution was dried for 1 hour over 100 parts of anhydrous sodium sulfate, and the solution was filtered. The filtrate was treated twice with 15 parts of activated charcoal at 50° C., the charcoal being removed by filtration after each treatment. The p-xylene then was removed from the pale yellow solution by distillation. A yellow liquid crude product (109.6 parts) remained and was distilled at reduced pressure to give 96.1 parts of a pale yellow liquid boiling between 252 and 270° C. at 0.2 mm. Hg. This material was treated with 2 parts of activated charcoal at 125° C. and filtered while hot through a sintered glass filter. The filtrate (84.9 parts) was a clear, colorless liquid having a pour point of $-2°$ C. This liquid was a mixture consisting of, by weight, approximately 33.0% of tetraphenoxy - bis(m - trifluoromethylphenoxy)triphosphonitrile, 26.4% of pentaphenoxy-mono(m-trifluoromethylphenoxy)triphosphonitrile, 22.1% of triphenoxy-tris(m-trifluoromethylphenoxy)triphosphonitrile, 8.8% of hexaphenoxytriphosphonitrile, 8.1% of diphenoxy-tetrakis(m-trifluoromethylphenoxy)triphosphonitrile, and 1.6% of monophenoxy - pentakis(m - trifluoromethylphenoxy)triphosphonitrile. Elemental analysis of the material was as follows:

|  | Percent C | Percent H | Percent F | Percent P | Percent N | Mol. wt. |
|---|---|---|---|---|---|---|
| Calcd. for $C_{38}H_{28}O_6F_6P_3N_3$ | 55.0 | 3.4 | 13.7 | 11.2 | 5.1 | 830 |
| Found | 55.2 | 3.4 | 14.9 | 10.5 | 4.7 | 795 |

This material had a pour point of $-2°$ C., an index of refraction of $n_D^{25} = 1.541$, a density of 1.39 g./cc. at 25° C., a boiling range between 252–270° C. at 0.2 mm. Hg, and viscosity of 12.1 centistokes at 210° F. The infrared spectrum of this material is entirely consistent with the above-described product mixture. A strong band at 1170 cm.$^{-1}$ demonstrates the P=N stretching frequency. The strong band at 1250 cm.$^{-1}$ is characteristic of the

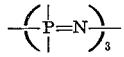

ring. The strong bands at 1190 cm.$^{-1}$ and 960 cm.$^{-1}$ demonstrate the presence of P—O—C where the C is in an aromatic ring. The presence of the benzene rings in the phenoxy groups is demonstrated by (1) the weak band at 3100 cm.$^{-1}$ for C—H stretch of an aromatic compound, (2) the strong C=C band at 1590 cm.$^{-1}$, (3) the strong aromatic ring resonance band at 1480 cm.$^{-1}$, (4) the strong C—H out of plane deformation band at 775 cm.$^{-1}$, and (5) the strong aromatic mono-substitution band at 690 cm.$^{-1}$. The presence of the m-trifluoromethylphenoxy group is shown by the medium intensity meta-substitution band at 1125 cm.$^{-1}$. The presence of the trifluoromethyl group is shown by the strong $CF_3$ symmetrical stretch band at 1320 cm.$^{-1}$ and the medium intensity antisymmetrical stretch band at 1130 cm.$^{-1}$.

When the above product mixture was subjected to any

|  | Percent C | Percent H | Percent F | Percent P | Percent N | Mol. wt. |
|---|---|---|---|---|---|---|
| Calcd. for $C_{56}H_{32}O_8F_{24}P_4N_4$ | 45.8 | 2.2 | 31.0 | 8.4 | 3.8 | 1,469 |
| Found | 45.7 | 2.4 | 29.7 | 8.3 | 3.8 | 1,370 | temperature up to at least 400° C. in an evacuated sealed "Pyrex" tube, the product remained stable, i.e., there was no significant change in appearance and physical properties for at least 10 hours. Heating was discontinued after this period only because no significant physical or chemical change occurred up to this time. This same product was heated in boiling aqueous 5% potassium hydroxide and was recovered unchanged, proving that the product was hydrolytically stable.

*Example 2*

A mixture of 58 parts (0.17 mole) of phosphonitrilic chloride trimer, 195 parts (1.2 moles) of m-trifluoromethylphenol, 67.5 parts (1.2 moles) of potassium hydroxide pellets, and 603 parts of p-xylene was charged to a flask as described in Example 1. The mixture was heated to reflux at 122° C. and heating was continued for a period of 5 hours as 28 parts of water was collected and the reflux temperature rose to 142° C. The reaction mixture was cooled to 25° C. and worked up as described in Example 1. After removal of the xylene by distillation, 159.0 parts of a yellow crude product remained and was distilled at reduced pressure to give 140 parts of a pale yellow liquid boiling at 250° C. at 0.2 mm. Hg. This material was treated with 3.0 parts of activated charcoal at 100° C. and filtered while hot to give 130.0 parts (71% yield) of a colorless, clear liquid identified as hexakis(m - trifluoromethylphenoxy)triphosphonitrile. Elemental analysis of this product was as follows:

This product had a pour point of −10° C., an index of refraction of $n_D^{25}=1.495$ at 25° C., a density of 1.51 g./cc. at 25° C. in the supercooled state, and a viscosity of 12.98 centistokes at 210° F. The infrared spectrum of this material is entirely consistent with that expected for octakis(m - trifluoromethylphenoxy)tetraphosphonitrile. The infrared spectrum was identical to that of the product of Example 2 except that a stretching band at 1370 cm.$^{-1}$ indicated the presence of a

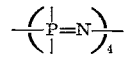

ring in lieu of a band at 1250 cm.$^{-1}$ which is characteristic of a

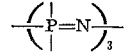

ring. The thermal and hydrolytic stability of this product was similar to that of the product of Example 2.

*Example 4*

A mixture of 49.3 parts (0.154 mole) of phosphonitrilic chloride trimer, 8.7 parts (0.016 mole) of phosphonitrilic chloride tetramer, 75.3 parts (0.80 mole) of phenol, 65.0 parts (0.40 mole) of m-trifluoromethylphenol, 67.3 parts (1.20 moles) of potassium hydroxide pellets, and 603 parts of p-xylene was charged to a flask as described in Example 1. The mixture was heated to reflux at 117° C. and heating was continued for a period of 7 hours as 26 parts of water was collected and the reflux temperature

|  | Percent C | Percent H | Percent F | Percent P | Percent N | Mol. wt. |
|---|---|---|---|---|---|---|
| Calcd. for $C_{42}H_{24}O_6F_{18}P_3N_3$ | 45.8 | 2.2 | 31.0 | 8.4 | 3.8 | 1,102 |
| Found | 44.2 | 2.4 | 29.5 | 8.1 | 3.8 | 1,085 |

This product had a pour point of −5° C., an index of refraction of $n_D^{25}=1.490$, a density of 1.50 g./cc. at 25° C., a boiling point of 250° C. at 0.2 mm. Hg and viscosity of 10.1 centistokes at 210° F. The infrared spectrum of this material was similar to that of Example 1, except that instead of the mono-substitution band, a strong m-disubstituted phenyl ring band at 695 cm.$^{-1}$ was demonstrated. This product had the same thermal and hydrolytic stability as the product of Example 1.

*Example 3*

The procedure and the proportions of reactants in Example 2 were used, except that 58 parts (0.17 mole) of phosphonitrilic chloride tetramer (PNCl$_2$)$_4$ was substituted for the phosphonitrilic chloride trimer. The mixture was refluxed between 120° C. and 145° C. for a period of 6 hours, 27 parts of water being collected. The reaction mixture was cooled to 25° C. and worked up as described in Example 1. The p-xylene solvent was rerose to 142° C. The reaction mixture was cooled to 25° C. and worked up as described in Example 1. After removal of the xylene by distillation, 139.3 parts of dark-amber crude product remained and was distilled at reduced pressure to give 113.3 parts of a yellow liquid boiling between 269 and 305° C. at 0.2 mm. Hg. This material was treated with 2 parts of activated charcoal at 110° C. and filtered while hot to give a pale yellow liquid which was redistilled at reduced pressure giving 102 parts of nearly colorless liquid boiling between 270 and 280° C. at 0.2 mm. Hg. This material was treated with 1.5 parts of activated charcoal at 105° C. and filtered while hot to give 96.0 parts of a colorless, clear liquid product. The infrared spectrum of this liquid was the same as that of the product of Example 1 except for the additional tetrameric phosphonitrile ring band at 1370 cm.$^{-1}$ and thus is entirely consistent with that expected for the desired product, viz, a mixture of phenoxy and m-trifluoromethylphenoxy groups statistically distributed on phosphonitrile trimer and tetramer rings. Elemental analysis of this product was as follows:

|  | Percent C | Percent H | Percent F | Percent P | Percent N | Mol. wt. |
|---|---|---|---|---|---|---|
| Calcd. for $C_{39.3}H_{28.8}O_{6.2}F_{6.2}P_{3.1}N_{3.1}$ | 55.0 | 3.4 | 13.7 | 11.2 | 5.0 | 847 |
| Found | 54.5 | 3.7 | 15.8 | 10.7 | 4.9 | 850 |

This product has a pour point of $-10°$ C., an index of refraction of $n_D^{25} = 1.548$ at 25° C., a density of 1.38 g./cc., and a viscosity of 12.4 centistokes at 210° F. Its thermal and hydrolytic stabilities are essentially the same as for the product of Example 1.

Example 5

The procedure and proportions of reactants in Example 2 were used, except that 58 parts (1 chlorine equivalent weight) of phosphonitrilic chloride liquid (a mixture of $(PNCl_2)_n$ in polymers where $n=3, 4, 5, 6$ and 7 as determined by infrared analysis; this liquid fraction was obtained according to the aforementioned Scheck and Römer method) was substituted for the phosphonitrilic chloride trimer. The mixture was refluxed between 117 and 141° C. for a period of 7 hours, 25 parts of water being collected. The reaction mixture was cooled to 25° C. and worked up as described in Example 1. The p-xylene solvent was removed from the yellow solution by distillation, leaving 79.0 parts of dark-amber viscous liquid crude product which was separated into 4 fractions by distillation at reduced pressure after discarding a forecut of 3.6 parts of yellow liquid. The first fraction, boiling between 250 and 269° C. at 0.07 mm. Hg, was 19.6 parts of yellow liquid which was shown to be predominantly hexakis(m - trifluoromethylphenoxy)triphosphonitrile by infrared analysis. The second fraction, boiling between 270 and 305° C. at 0.07 mm. Hg, was 13.5 parts of yellow liquid which was shown to be predominantly octakis(m-trifluoromethylphenoxy)tetraphosphonitrile by infrared analysis. The third fraction was 16.8 parts of yellow, viscous liquid boiling between 306 and 346° C. at 0.07 mm. Hg which is consistent with being predominantly decakis(m-trifluoromethylphenoxy)pentaphosphonitrile, and the fourth fraction was 9.9 parts of amber-colored liquid boiling between 347 and 370° C. at 0.07 mm. Hg and which is consistent with being predominantly dodecakis(m - trifluoromethylphenoxy)hexaphosphonitrile. The infrared spectra of the third and fourth fractions are consistent with the structures stated above, but polymers higher than tetramer cannot be easily distinguished by infrared analysis. The third and fourth fractions remain liquid at ambient temperatures.

A comparison of the molecular weights as determined by osmometry, the indices of refraction at 25° C. ($n_D^{25}$), and the viscosities in centistokes at 210° F. ($\eta_{210°\text{F.}}$) for each of the four fractions distilled and for authentic samples of the compositions is as follows:

|  | Mol. wt. | $n_D^{25}$ | $\eta_{210°\text{F.}}$ (cs.) | Pour point (° C.) | B.P. (° C. at 0.2 mm.) |
|---|---|---|---|---|---|
| Fraction 1—authentic hexakis(m-trifluoromethylphenoxy)triphosphonitrile. | 1,111 / 1,101 | 1.492 / 1.490 | 10.9 / 10.1 | −12 / −5 | 250–269 / 250 |
| Fraction 2—authentic octakis(m-trifluoromethylphenoxy)tetraphosphonitrile. | 1,428 / 1,469 | 1.496 / 1.495 | 18.3 / 13.0 | −9 / −10 | 270–305 / 280 |
| Fraction 3—authentic decakis(m-trifluoromethylphenoxy)pentaphosphonitrile. | 1,825 / 1,837 | 1.499 / (*) | 48.7 / (*) | 0 / (*) | 306–346 / (*) |
| Fraction 4—authentic dodecakis(m-trifluoromethylphenoxy)hexaphosphonitrile. | 1,939 / 2,202 | 1.501 / (*) | 130.5 / (*) | +12 / (*) | 347–375 / (*) |

* Not determined.

These values are consistent with the compositions as given above for each of the four fractions.

The products had the same thermal and hydrolytic stability as the product of Example 1.

The total product of this example, any one of the four fractions, or combinations thereof may be used in the disclosed applications, depending on the desired viscosity characteristics for the particular application.

Example 6

A mixture of 197 parts (0.567 mole) of phosphonitrilic chloride trimer $(PNCl_2)_3$, 35 parts (0.075 mole) of phosphonitrilic chloride tetramer $(PNCl_2)_4$, 778 parts (4.80 moles) of m-trifluoromethylphenol, 269 parts (4.80 moles) of potassium hydroxide pellets and 2,410 parts of p-xylene solvent was charged to a flask as described in Example 1. The mixture was heated to reflux at 144° C. for six hours. During the reaction, 110 parts of water was collected. The reaction mixture was cooled to 25° C. and worked up as described in Example 1. The p-xylene solvent was removed by distillation from the amber-colored solution and 785 parts of dark red-orange liquid remained. This material was distilled at reduced pressure to give 685 parts of an orange liquid boiling between 250 and 270° C. at 0.20 mm. Hg. This liquid was treated with 3 parts of activated charcoal at 120° C. and filtered while hot to give 652 parts of a yellow liquid product consisting of a mixture of approximately 85% by weight of hexakis(m-trifluoromethylphenoxy)triphosphonitrile and approximately 15% by weight of octakis(m-trifluoromethylphenoxy)tetraphosphonitrile. The infrared spectrum of the product was entirely consistent with that expected for the desired product. This liquid had a pour point of $-10°$ C., an index of refraction of $n_D^{25} = 1.490$ at 25° C., a density of 1.50 g./cc. at 25° C., and a viscosity of 10.6 centistokes at 210° F. This product had the same high thermal and hydrolytic stability as the product of Example 1. This product is extremely resistant to oxidation, being essentially unchanged after exposure to 600° F. for 24 hours with air passing through the liquid at a rate of 2 liters per hour.

The present invention has been described in detail in the foregoing. However, it will be apparent that many variations may be introduced without departure from the scope of the invention. It is intended, therefore, to be limited only by the following claims.

What is claimed is:

1. Polymeric phosphonitriles selected from the group consisting of (A) phosphonitrilic compositions of the formula $P_mN_mR_nR'_{2m-n}$, wherein R is meta-trifluoromethylphenoxy, R' is phenoxy, m is an integer from 3 to 7 and n is an integer from 1 to 2m, and (B) mixtures of (A) and phosphonitrilic compositions selected from the group consisting of those of the formula $P_mN_mR'_{2m}$, wherein R' and m are as defined above, said mixtures containing a maximum of about 27% by weight of the composition where n is 0.

2. Polymeric phosphonitriles selected from the group consisting of phosphonitrilic compositions of the formula $P_mN_mR_nR'_{2m-n}$, wherein R is meta-trifluoromethylphenoxy, R' is phenoxy, m is an integer from 3 to 7 and n is an integer from 1 to 2m.

3. Hexakis(m - trifluoromethylphenoxy)triphosphonitrile.

4. Octakis(m - trifluoromethylphenoxy)tetraphosphonitrile.

5. Decakis(m - trifluoromethylphenoxy)pentaphosphonitrile.

6. Dodecakis(m - trifluoromethylphenoxy)hexaphosphonitrile.

7. Polymeric mixtures of (A) phosphonitrilic compositions of the formula $P_mN_mR_nR'_{2m-n}$, wherein R is meta-trifluoromethylphenoxy, R' is phenoxy, $m$ is an integer from 3 to 7 and $n$ is an integer from 1 to $2m$, and (B) phosphonitrilic compositions selected from the group consisting of those of the formula $P_mN_mR'_{2m}$, wherein, R' and $m$ are as defined above, said mixtures containing a maximum of about 27% by weight of the composition where $n$ is 0.

References Cited by the Examiner
UNITED STATES PATENTS

| | | | |
|---|---|---|---|
| 2,109,491 | 3/1938 | Lipkin | 260—461.304 |
| 2,192,921 | 3/1940 | Lipkin | 260—461.304 |
| 2,214,769 | 9/1940 | Lipkin | 260—461.303 XR |
| 2,225,285 | 12/1940 | Moyle | 260—461.311 |
| 2,795,598 | 6/1957 | Scherer et al. | 260—461.112 |
| 2,833,635 | 5/1958 | Hill et al. | 260—461.304 |
| 3,136,727 | 6/1964 | Nichols | 260—461.303 XR |

OTHER REFERENCES

Yokoyama: "Nippon Kagaku Zasshi," 81, 481–484 (1960).

CHARLES B. PARKER, *Primary Examiner.*

MORRIS LIEBMAN, *Examiner.*